(12) United States Patent
Kobayashi et al.

(10) Patent No.: US 8,552,395 B2
(45) Date of Patent: Oct. 8, 2013

(54) ULTRAVIOLET IRRADIATION SYSTEM

(75) Inventors: Shinji Kobayashi, Yokohama (JP); Norimitsu Abe, Kawasaki (JP); Takahiro Soma, Kawasaki (JP); Akihiko Shirota, Hachioji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/969,077

(22) Filed: Dec. 15, 2010

(65) Prior Publication Data
US 2011/0150707 A1    Jun. 23, 2011

(30) Foreign Application Priority Data
Dec. 22, 2009   (JP) ................................ 2009-291297

(51) Int. Cl.
*G01J 1/42*   (2006.01)

(52) U.S. Cl.
USPC .......................................... 250/372; 250/373

(58) Field of Classification Search
USPC ................................. 250/372, 373
See application file for complete search history.

(56) References Cited

U.S. PATENT DOCUMENTS

| | | | |
|---|---|---|---|
| 4,017,734 A * | 4/1977 | Ross .............................. | 250/431 |
| RE34,513 E | 1/1994 | Ellner | |
| 6,235,191 B1 | 5/2001 | Nakamura | |
| 6,264,836 B1 * | 7/2001 | Lantis ........................... | 210/188 |
| 6,265,835 B1 * | 7/2001 | Parra ............................. | 315/246 |
| 6,459,087 B1 * | 10/2002 | Kaas .............................. | 250/372 |
| 6,803,586 B1 * | 10/2004 | Brunet et al. ................. | 250/434 |
| 7,645,391 B2 * | 1/2010 | Musslin et al. ........... | 250/432 R |
| 7,740,753 B2 | 6/2010 | Abe et al. | |
| 7,820,038 B2 | 10/2010 | Abe et al. | |
| 2006/0222576 A1 * | 10/2006 | Rudkowski et al. ....... | 422/186.3 |
| 2008/0006583 A1 | 1/2008 | Perry et al. | |
| 2009/0166276 A1 | 7/2009 | Abe et al. | |
| 2010/0294726 A1 * | 11/2010 | Butters et al. .............. | 210/748.1 |
| 2012/0235050 A1 * | 9/2012 | Abe et al. ...................... | 250/373 |

FOREIGN PATENT DOCUMENTS

| | | |
|---|---|---|
| CN | 1413297 A | 4/2003 |
| CN | 101497487 A | 8/2009 |
| DE | 3739966 A1 | 6/1989 |
| EP | 0317735 A2 | 5/1989 |
| JP | 63-42708 | 2/1988 |
| JP | 4-188698 | 7/1992 |
| JP | 8-229550 | 9/1996 |
| JP | 9-062400 | 3/1997 |

(Continued)

OTHER PUBLICATIONS

Search Report from the European Patent Office mailed Apr. 19, 2011, for European Application No. 10195252.1.

(Continued)

*Primary Examiner* — Christine Sung
(74) *Attorney, Agent, or Firm* — Finnegan, Henderson, Farabow, Garrett & Dunner L.L.P.

(57) ABSTRACT

According to one embodiment, an ultraviolet irradiation system that sterilizes, disinfects, and inactivates raw water such as city water or underground water, includes a plurality of ultraviolet irradiation devices connected in series, and a controller configured to control output and non-output of the ultraviolet irradiation devices. The ultraviolet irradiation device includes a water processing vessel through which the raw water flows, an ultraviolet lamp configured to irradiate the raw water in the water processing vessel with ultraviolet rays, and an ultraviolet sensor configured to measure an amount of ultraviolet rays emitted from the ultraviolet lamp.

1 Claim, 3 Drawing Sheets

(56) References Cited

FOREIGN PATENT DOCUMENTS

| | | |
|---|---|---|
| JP | 10-43768 | 2/1998 |
| JP | 11-128913 | 5/1999 |
| JP | 2001-87757 | 4/2001 |
| JP | 2002-233883 | 8/2002 |
| JP | 2004-223502 | 8/2004 |
| JP | 2004-267976 | 9/2004 |
| JP | 2004-305889 | 11/2004 |
| JP | 2005-50588 | 2/2005 |
| JP | 2006-085605 | 3/2006 |
| JP | 2007-245080 | 9/2007 |
| JP | 2008-62203 | 3/2008 |
| JP | 2008-234100 | 10/2008 |
| JP | 2010-12429 | 1/2010 |
| WO | WO 01/29535 A1 | 4/2001 |
| WO | WO 2005/102401 A2 | 11/2005 |
| WO | WO 2005/102401 A3 | 11/2005 |

OTHER PUBLICATIONS

Kobayashi et al., U.S. Appl. No. 12/969,177, filed Dec. 15, 2010.
Notification of the First Office Action issued by the State Intellectual Property Office (SIPO) of the People's Republic of China in Application No. 201010625004.0, dated Jul. 3, 2012.
Notice of Reasons for Rejection issued by Japanese Patent Office in Application No. 2009-291297, mailed Jan. 31, 2012.
First Office Action issued by Japanese Patent Office in Japanese Patent Application No. 2009-291297, mailed Jan. 8, 2013.

* cited by examiner

ULTRAVIOLET IRRADIATION SYSTEM

CROSS-REFERENCE TO RELATED APPLICATIONS

This application is based upon and claims the benefit of priority from Japanese Patent Application No. 2009-291297, filed Dec. 22, 2009; the entire contents of which are incorporated herein by reference.

FIELD

Embodiments described herein relate generally to an ultraviolet irradiation system that sterilizes, disinfects, or inactivates raw water such as city water or underground water making use of ultraviolet rays.

BACKGROUND

Chemicals such as ozone and chlorine are used to perform sterilization and disinfection of city water and underground water, sterilization, disinfection, and decoloration of industrial water, or bleaching of pulp, and further sterilization of medical equipment and the like.

In a conventional disinfection device, since a retention vessel and a stirring device such as a spray pump are necessary to uniformly dissolve ozone and a chemical in water to be processed, a change of water quality and water amount cannot be instantly coped with. In contrast, since ultraviolet rays have sterilizing, disinfecting and decoloring actions, deodorizing and decoloring actions of industrial water, or a bleaching action of pulp, and the like, the ultraviolet rays have a merit of instantly coping with a change of water quality and water amount. Thus, recently, an attention has been paid to an ultraviolet irradiation device that sterilizes and purifies water by irradiating water to be processed with ultraviolet rays as one of sterilization-disinfection means. Jpn. Pat. Appln. KOKAI Publication No. 2004-223502 discloses an ultraviolet sterilization-purification device having a function of detecting a crack and damage of a protection pipe for protecting an ultraviolet lamp, and the like.

However, the ultraviolet sterilization-purification device has the following problems.

(1) When ultraviolet rays are used, supplied water and sewage water are sterilized, disinfected, and inactivated within a few seconds during which they are irradiated with ultraviolet rays from an ultraviolet source. However, when an ultraviolet lamp with a high brightness and a high output is used as an ultraviolet source, since the lamp has a short life, a predetermined ultraviolet output, which is necessary for disinfection, sterilization, and inactivation, cannot be ensured until a periodic maintenance cycle per year is reached.

(2) When the ultraviolet lamp is used as the ultraviolet source, the predetermined ultraviolet output, which is necessary for disinfection, sterilization and inactivation, cannot be ensured until a lamp life is reached depending on operation history such as the number of turnon and turnoff times, an environment in which the ultraviolet lamp is installed, and an increase and decrease of a lamp input.

DETAILED DESCRIPTION

Figure 1:
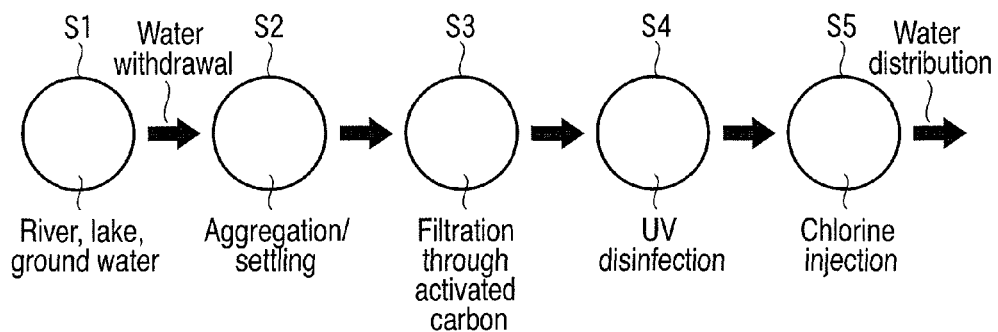
FIG. 1 is a view for explaining processing procedures in a supplied water processing system.

In general, according to one embodiment, an ultraviolet irradiation system that sterilizes, disinfects, and inactivates raw water such as city water or underground water, includes a plurality of ultraviolet irradiation devices connected in series, and a controller configured to control output and non-output of the ultraviolet irradiation devices. The ultraviolet irradiation device includes a water processing vessel through which the raw water flows, an ultraviolet lamp configured to irradiate the raw water in the water processing vessel with ultraviolet rays, and an ultraviolet sensor configured to measure an amount of ultraviolet rays emitted from the ultraviolet lamp.

According to another embodiment, an ultraviolet irradiation system that sterilizes, disinfects, and inactivates raw water such as city water or underground water, includes a plurality of ultraviolet irradiation devices, a plurality of on-off valves that allow one ultraviolet irradiation device of the ultraviolet irradiation devices to be used or allow the plurality of ultraviolet irradiation devices to be connected in series or in parallel and to be used, and a controller configured to control opening and closing of the on-off valves. The ultraviolet irradiation device includes a water processing vessel comprising a water supply port into which the raw water flows, an ultraviolet lamp configured to irradiate the raw water that flows in the water processing vessel with ultraviolet rays, and a water discharge port from which the raw water irradiated with the ultraviolet rays is discharged; and an ultraviolet sensor configured to measure an amount of ultraviolet rays emitted from the ultraviolet lamp.

(1) An ultraviolet irradiation system according to the embodiment includes a plurality of ultraviolet irradiation devices connected in series and a controller configured to control an output and a non-output of the ultraviolet irradiation devices. When ultraviolet outputs from ultraviolet lamps of the ultraviolet irradiation devices are lowered below a predetermined value, the controller preferably switches the ultraviolet irradiation devices sequentially. Further, when the ultraviolet outputs from the ultraviolet lamps of the ultraviolet irradiation devices are lowered below the predetermined value or when an ultraviolet transmittance to raw water is lowered, the controller preferably uses all the ultraviolet irradiation devices or increases the number of the ultraviolet irradiation devices to be used.

The ultraviolet outputs are lowered below the predetermined value because a performance of the ultraviolet lamps themselves is deteriorated with the used time and because protection pipes and the like which protect the ultraviolet lamps are contaminated and thus ultraviolet rays applied to water to be processed are lowered. On the other hand, the ultraviolet transmittance is lowered because water quality is varied or the like, although the performance of the ultraviolet lamps or contamination of the protection pipes does not particularly cause problem.

(2) An ultraviolet irradiation system according to another embodiment includes a plurality of ultraviolet irradiation devices, on-off valves, and a controller, and the on-off valves allow only one ultraviolet irradiation device to be used or allow the plurality of ultraviolet irradiation devices to be connected in series or in parallel and to be used. When an amount of raw water to be processed exceeds a range of processing capacity of one ultraviolet irradiation device, the controller preferably connects the plurality of ultraviolet irradiation devices in parallel and uses the devices. Also, when ultraviolet outputs from ultraviolet lamps of the ultraviolet irradiation devices are lowered below the predetermined value or when an ultraviolet transmittance to raw water is lowered, the controller preferably connects the plurality of ultraviolet irradiation devices in series and uses the devices. Thus, a predetermined ultraviolet output necessary for disinfection, sterilization, and inactivation can be ensured until a periodic maintenance cycle is reached by changing a mode of use of the ultraviolet irradiation devices by switching operations of the on-off valves.

Next, an outline of a process in a supplied water processing system will be described with reference to FIG. 1.

First, raw water is taken from a river, a lake, or underground water (step S1), the taken raw water is introduced to an aggregation-settling vessel to which an aggregation agent is added thereby effecting aggregation and settling (step S2). Next, supernatant water in the aggregation-settling vessel is sent to an activated carbon filter vessel, and foreign substances are filtered off (step S3), and the filtered water is sent to an ultraviolet irradiation device and irradiated with ultraviolet rays (step S4), and the UV sterilized water is sent to a chlorine injection vessel to which chlorine is injected (step S5), and then the water is distributed to ordinary households, business facilities and the like.

Next, ultraviolet irradiation systems according to embodiments will be described with reference to the drawings. Note that the embodiments are by no means limited to the following description.

(First Embodiment)

Figure 2:
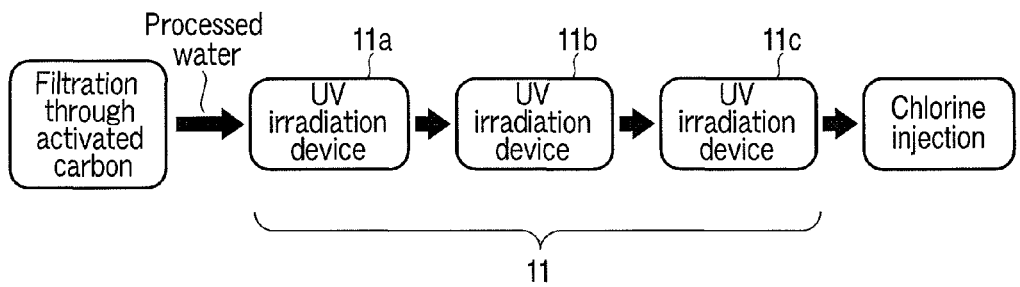
FIG. 2 is a view for explaining an ultraviolet irradiation system according to a first embodiment.
Figure 3A:
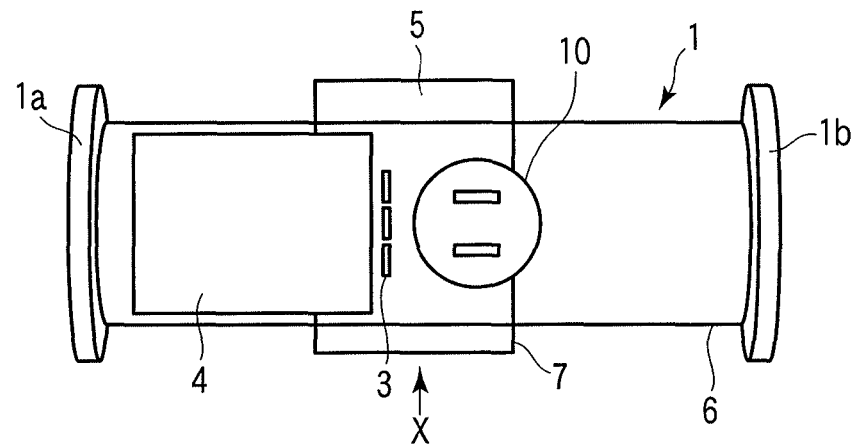
FIG. 3A is a plan view of an ultraviolet irradiation device according in FIG. 2.
Figure 3B:
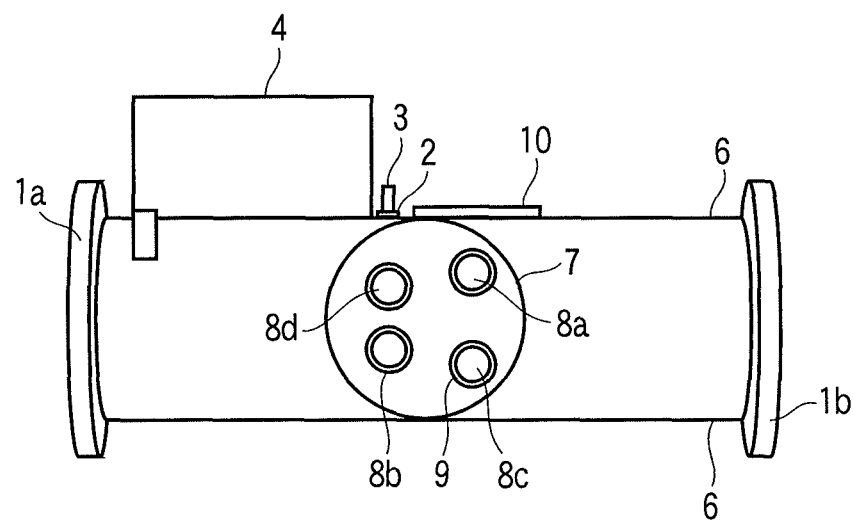
FIG. 3B is a side elevational view thereof.

A first embodiment will be described with reference to FIGS. 2, 3A and 3B. FIG. 2 is an schematic view of an ultraviolet irradiation system according to the first embodiment, FIG. 3A is a plan view of an ultraviolet irradiation device used in the ultraviolet irradiation system, and FIG. 3B is a side elevational view thereof as viewed from an X-direction. Note that the first embodiment is by no means limited to the following description.

As shown in FIG. 2, an ultraviolet irradiation system 11 of the first embodiment includes three sets of ultraviolet irradiation devices 11a, 11b, 11c connected in series and a controller (not shown) configured to control opening and closing of a plurality of on-off valves of the ultraviolet irradiation devices. The ultraviolet irradiation devices are electrically connected to the controller.

As shown in FIGS. 3A and 3B, each of the ultraviolet irradiation devices includes a reactor 1 as a water processing vessel, monitor windows 2, ultraviolet sensors 3, a counter (not shown), a power supply box 4 as a controller, and a cleaning mechanism 5. The reactor 1 includes a first pipe 6 having a water supply port 1a into which raw water flows and a water discharge port 1b from which processed raw water irradiated with ultraviolet rays is discharged, and a second pipe 7 that intersects the first pipe 6. Four ultraviolet lamps (medium pressure mercury lamps) 8a, 8b, 8c, 8d, which are protected by quartz protection pipes 9, are disposed in the second pipe 7. An inspection window 10 is disposed in a part of the first pipe 6 that intersects the second pipe 7.

Of the four ultraviolet lamps 8a to 8d, the ultraviolet lamp 8a and the ultraviolet lamp 8b are used in pair and the ultraviolet lamp 8c and the ultraviolet lamp 8d are used in pair in relation to a flow of water to be processed in the reactor. The ultraviolet sensors 3 are disposed to measure ultraviolet irradiation amounts from the ultraviolet lamps 8a to 8d through the monitor windows 2. The counter is disposed to measure irradiation time of the ultraviolet lamps 8a to 8d and electrically connected to the ultraviolet lamps 8a to 8d. The power supply box 4 includes an electronic stabilizer that is necessary to turn on the ultraviolet lamps 8a to 8d, a controller of the cleaning mechanism 5, and the like. Further, although not shown, a control device, which controls turnon and turnoff of the ultraviolet lamps 8a to 8d, is electrically connected to the ultraviolet lamps 8a to 8d. The control device includes a cumulation timer (or a built-in timer). The cleaning mechanism 5 includes brushes and the like that clean outer peripheral portions of the protection pipes 9 which protect the ultraviolet lamps 8a to 8d.

In the ultraviolet irradiation system configured as described above, first, just after the ultraviolet irradiation system is operated, only the first ultraviolet irradiation device 11a is operated, and when the ultraviolet irradiation device 11a reaches a life limit, the ultraviolet irradiation devices 11b, 11c are sequentially switched in this order and operated.

According to the first embodiment, when the first ultraviolet irradiation device 11a reaches the life limit, since the ultraviolet irradiation devices 11b, 11c can be sequentially switched in this order and operated, the ultraviolet irradiation system can be operated while continuously supplying water. Accordingly, there can be obtained an ultraviolet irradiation system which can keep sterilization, disinfection, and inactivation capabilities even if a period of a maintenance cycle is reached.

Note that in the first embodiment, when the first ultraviolet irradiation device reaches the life limit, the first ultraviolet irradiation device is switched to a next ultraviolet irradiation device, but the embodiment is by no means limited thereto. When, for example, an ultraviolet output from ultraviolet lamps built in the first ultraviolet irradiation device is lowered below the predetermined value and a predetermined ultraviolet output cannot be ensured only by ultraviolet lamps built in one ultraviolet irradiation device, the raw water may be continuously supplied while ensuring an ultraviolet output necessary to sterilize, disinfect, and inactivate the raw water using two or more sets of the other ultraviolet irradiation devices or increasing the number of built-in ultraviolet lamps to be turned on. Further, when an ultraviolet transmittance from the ultraviolet lamps is lowered due to a variation of water quality and the like in place of the case where the ultraviolet output is lowered below the predetermined value, the same operation may be performed.

(Second Embodiment)

Figure 4:
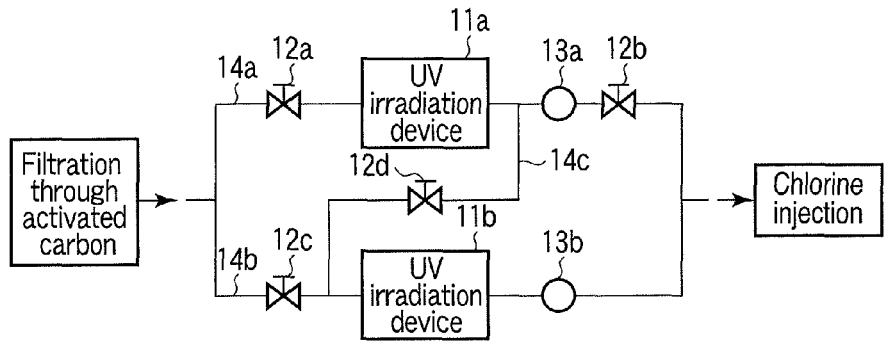
FIG. 4 is a view for explaining an ultraviolet irradiation system according to a second embodiment.

An ultraviolet irradiation system according to a second embodiment will be described with reference to FIG. 4.

The ultraviolet irradiation system of the second embodiment includes two sets of ultraviolet irradiation devices 11a, 11b, on-off valves 12a, 12b, 12c, 12d, a controller (not shown) configured to control output and non-output of the ultraviolet irradiation devices 11a, 11b, and flow meters 13a, 13b with blades. As described above, the ultraviolet irradiation devices 11a, 11b are configured as shown in FIG. 2 and electrically connected to the controller. Since the flow meters 13a, 13b are influenced by a flow of raw water, they are disposed on a downstream side of the ultraviolet irradiation devices 11a, 11b, respectively. However, when electromagnetic flow meters are used, they may be disposed otherwise.

The on-off valve 12a, the ultraviolet irradiation device 11a, the flow meter 13a and the on-off valve 12b are connected to a pipe 14a branched from a pipe from an activated carbon filter device (not shown). The on-off valve 12c, the ultraviolet irradiation device 11b, and the flow meter 13b are connected to a pipe 14b branched from the pipe from the activated carbon filter device. The on-off valve 12d is connected to a pipe 14c that connects the pipe 14a of the ultraviolet irradiation device 11a on an outlet side and the pipe 14b of the ultraviolet irradiation device 11b on an inlet side.

The ultraviolet irradiation device 11a (or 11b) of the two sets of ultraviolet irradiation devices can be used or both the ultraviolet irradiation devices 11a, 11b can be connected in series or in parallel so as to be used by switching opening and closing of the on-off valves 12a to 12d.

In the ultraviolet irradiation system configured as described above, first, when an amount of raw water is within a predetermined range to be subjected to an ordinarily process, the raw water is processed by opening the on-off valves 12a, 12b and closing the on-off valves 12c, 12d so that the ultraviolet irradiation system is operated by, for example, only the ultraviolet irradiation device 11a just after the operation of the system starts. Thereafter, when the ultraviolet irradiation device 11a reaches a life limit, the raw water is processed by opening the on-off valve 12c and closing the on-off valve 12a, 12b, 12d so that the ultraviolet irradiation system is operated only by the ultraviolet irradiation device 11b.

According to the second embodiment, when the first ultraviolet irradiation device 11a reaches the life limit, since the ultraviolet irradiation device 11b can be operated by switching opening and closing of the on-off valves 12a to 12d, the ultraviolet irradiation system can be operated while supplying the water. Accordingly, there can be obtained an ultraviolet irradiation system which can keep sterilization, disinfection, and inactivation capabilities even if a period of a maintenance cycle is reached.

Note that in the second embodiment, when the first ultraviolet irradiation device 11a reaches the life limit, the first ultraviolet irradiation device 11a is switched to another ultraviolet irradiation device 11b, but the second embodiment is by no means limited thereto. When, for example, an ultraviolet output from ultraviolet lamps built in the first ultraviolet irradiation device 11a is lowered below a predetermined value, the first ultraviolet irradiation device 11a may be switched to the another ultraviolet irradiation device 11b as described above even before the ultraviolet irradiation device 11a reaches the life limit so that the ultraviolet irradiation system is operated while supplying the water.

Figure 5A:
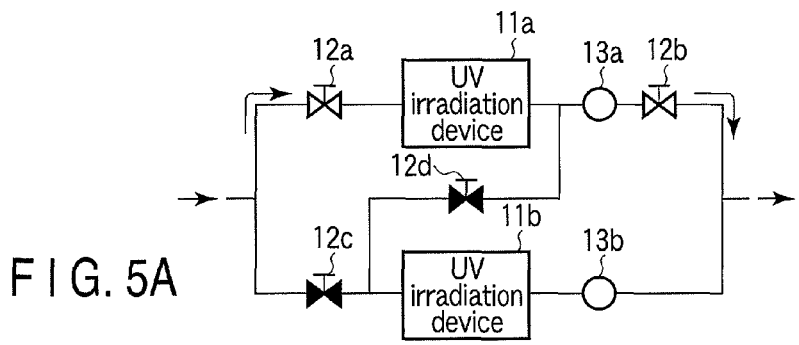
FIGS. 5A, 5B, and 5C are views for explaining an example in which ultraviolet irradiation devices in the ultraviolet irradiation system of FIG. 4 are switched by on-off valves.
Figure 5B:
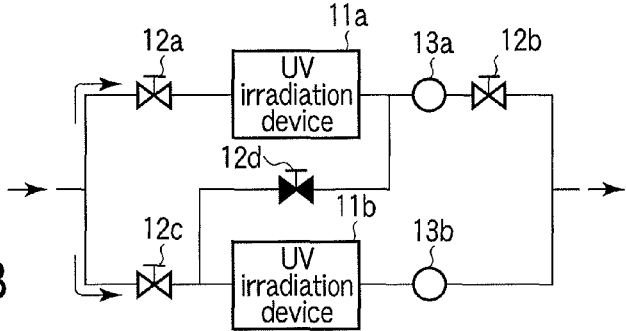

Further, when the raw water is processed by one ultraviolet irradiation device, a case in which only the ultraviolet irradiation device 11a is operated by opening the on-off valves 12a, 12b and closing the on-off valves 12c, 12d as shown in, for example, FIG. 5A, is exemplified. However, when the amount of the raw water to be processed exceeds a processing capacity of one ultraviolet irradiation device, the ultraviolet irradiation devices 11a, 11b may be connected in parallel and used by opening the on-off valves 12a, 12b, 12c and closing the on-off valve 12d as shown FIG. 5B.

Figure 5C:
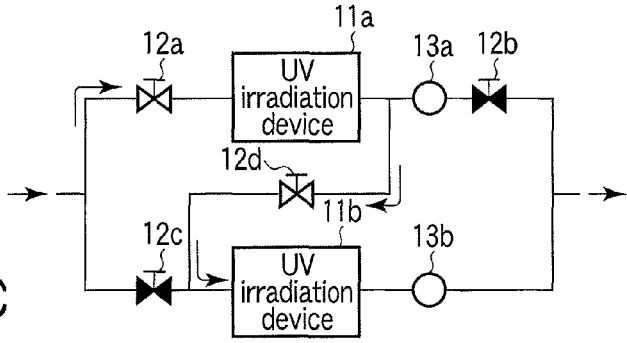

Further, when an ultraviolet transmittance of the raw water is lowered and the raw water cannot be processed when it is supplied using only one ultraviolet irradiation device, the raw water is supplied using the ultraviolet irradiation devices 11a, 11b connected in series by opening the on-off valves 12a, 12d and closing the on-off valves 12c, 12d as shown in FIG. 5C so that the ultraviolet radiation system may be operated while keeping a performance by irradiating an amount of ultraviolet rays necessary to sterilize, disinfect, and inactivate the raw water. Note that also when an ultraviolet output from ultraviolet lamps built in a part of or all of the ultraviolet irradiation devices are lowered below the predetermined value, the ultraviolet irradiation system can be operated in the state of the on-off valves as shown in FIG. 5C.

In the first embodiment, the three sets of the ultraviolet irradiation devices are used and in the second embodiment, the two sets of the ultraviolet irradiation devices are disposed, but the embodiments are by no means limited thereto.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An ultraviolet irradiation system that sterilizes, disinfects, and inactivates raw water such as city water or underground water, comprising:
   a plurality of ultraviolet irradiation devices;
   a plurality of on-off valves that allow one ultraviolet irradiation device of the ultraviolet irradiation devices to be used or allow the plurality of ultraviolet irradiation devices to be connected in series or in parallel and to be used; and
   a controller configured to control opening and closing of the on-off valves,
   wherein the ultraviolet irradiation device comprises:
      a water processing vessel comprising a water supply port into which the raw water flows;
      an ultraviolet lamp configured to irradiate the raw water that flows in the water processing vessel with ultraviolet rays;
      a water discharge port from which the raw water irradiated with the ultraviolet rays is discharged; and
      an ultraviolet sensor configured to measure an amount of ultraviolet rays emitted from the ultraviolet lamp, and
   wherein the controller is configured to control opening and closing of the on-off valves to connect the plurality of ultraviolet irradiation devices in parallel when an amount of the raw water exceeds a range of a processing capacity of one ultraviolet irradiation device.

* * * * *